May 13, 1969   N. G. WELCH   3,444,448
MULTIPLE INPUT, SOLID STATE, REVERSING, MOTOR
CONTROL WITH DIRECTION LOCK-OUT
Filed Nov. 21, 1966
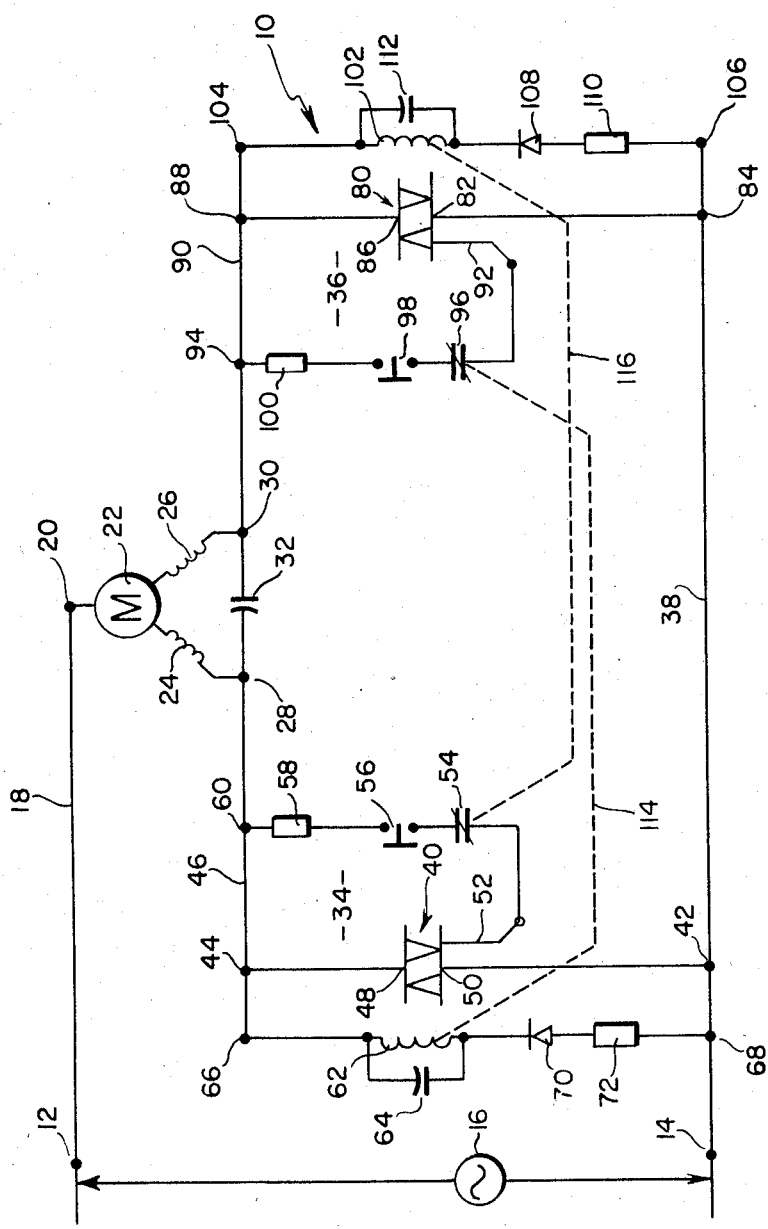
INVENTOR.
Newell G. Welch
BY
Gary, Parker, Justner + Cullinan
ATTORNEYS

United States Patent Office 3,444,448
Patented May 13, 1969

3,444,448
MULTIPLE INPUT, SOLID STATE, REVERSING, MOTOR CONTROL WITH DIRECTION LOCK-OUT
Newell G. Welch, Waynesboro, Va., assignor to Acme Visible Records, Inc., Crozet, Va., a corporation of Delaware
Filed Nov. 21, 1966, Ser. No. 595,847
Int. Cl. H02p 1/22, 1/40
U.S. Cl. 318—207                      11 Claims

ABSTRACT OF THE DISCLOSURE

A motor control comprising a reversible motor, a first circuit for providing current for clockwise rotation of said motor, a second circuit for providing current for counterclockwise rotation of said motor, said circuits each including a manually operable switch and a relay operable switch in series, a gated control means having a pair of electrodes and a control gate, said switches being connected in series with said control gate, and a relay, said relay in one of said circuits operatively connected to the relay operable switch in the other of said circuits, said relay being in parallel with said gated control means. The motor control includes an A.C. source operatively connected to said motor and said control circuits; the gated control means being a bi-directional semiconductor triode, and further including a diode in series and a capacitor in parallel with said relay.

---

This invention relates to a motor control circuit, and more particularly to a circuit for controlling the clockwise and counterclockwise rotation of a motor.

Background and objects

Various types of circuits have been devised to control the forward and reverse operation of A.C. motors. These have been quite complex because of the need for a large number of mechanical elements. Even when semiconductive elements have been used in the circuits, they have by necessity been relatively complex since silicon controlled rectifiers and the like are operable only on direct current. Therefore, SCR circuits controlling reversible A.C. motors require bridge rectifier circuits.

Another feature lacking from prior art semiconductor circuits of this type is the fact that there has not been provided adequate means for interlocking the control elements to prevent both the clockwise and counterclockwise windings from being energized simultaneously.

It is therefore an object of the instant invention to provide a motor reversing control circuit which alleviates the disadvantages of the prior art.

It is a further object to provide a control circuit utilizing TRIACS for controlling the flow of alternating currents to separate loads. The term TRIAC is the generic name given to semiconductor triodes which conduct alternating current. These are also known as bi-directional triode silicon thyristors.

It it is still another object to provide a circuit for applying current to loads directly through the use of TRIACS, thus eliminating the need for bridge rectifiers.

It is a further object of the invention to provide TRIACS which are self interlocking, whereby the application of current to two loads simultaneously is prevented.

Another object of the invention is to provide a motor circuit of extreme simplicity which will not only control the reverse operation of a motor, but will also prevent both the forward and reverse windings from being energized simultaneously.

In one form of the invention, a motor control circuit includes a reversible motor operated on alternating current. First and second control circuits are provided for furnishing current for clockwise and counterclockwise rotation of the motor respectively. These circuits include a bi-directional triode having a pair of electrodes and a control gate. A relay is provided in parallel with the bi-directional means, the relay in one circuit operating a switch in the gate circuit of the bi-directional control element in the other circuit, whereby the control circuits are interlocked.

The above and other objects and advantages of the invention will readily become apparent from the following description taken in conjunction with the accompanying drawing wherein:

The figure of the drawings illustrate a motor control circuit according to the instant invention.

Detailed description

Referring now to the drawing, a control circuit 10 includes a pair of input terminals 12 and 14. Across these input terminals is a source of alternating current 16 which may be in the order of 115 volts. Input terminal 12 is connected through a line 18 to a load terminal 20. The load terminal 20 connects to a load 22 in the form of a reversible alternating current motor 22. The motor 22 has a first winding 24 for clockwise rotation and a second winding 26 which controls the counterclockwise rotation of the motor. The windings 22 and 26 are connected to a pair of load terminals 28 and 30 respectively. A motor capacitor 32 is seen connected across terminals 28 and 30.

A pair of substantially identical control circuits 34 and 36 are connected between the input terminal 14 and the load terminals 28 and 30. The circuits 34 and 36 have a common reference line 38.

Referring now to control circuit 34, a bi-directional triode semiconductor (TRIAC) 40 is connected to line 38 at terminal 42 and to the clockwise winding 24 at a terminal 44 which is connected to the load terminal 28, through a line 46. The bi-directional element or TRIAC 40 which is normally nonconductive includes a pair of electrodes 48 and 50 and a gate electrode 52. Connected in series with the gate 52 is a relay operable switch 54 and a manually operable switch 56. Switches 54 and 56 are also connected in series with a resistor 58 which may be in the order of 100 ohms. The resistor in turn is connected to line 46 at terminal 60.

Connected in parallel with the TRIAC 40 is a relay coil 62. A relay capacitor 64 which may be in the order of 8 mfd./150 volts is connected across the relay coils 62. One terminal of the relay coil is also connected to line 46 at a terminal 66. The other side of the coil is connected to a terminal 68 on line 38, through a diode 70 and a resistor 72 which may be a 15K, 1 watt resistor.

The circuit 36 is substantially identical to circuit 34. Therefore, in the same manner as circuit 34, a TRIAC 70 is connected through an electrode 82 to a terminal 84 on line 38. Another electrode 86 is connected to a terminal 88 on a line 90 which in turn connects to the counterclockwise winding 26 at load terminal 30. A gate 92 is connected to line 90 at a terminal 94 through a relay operable switch 96, a manually operable switch 98 and a resistor 100. A relay 102 is connected to line 90 at a terminal 104 to line 38 at a terminal 106 through a diode 108 and a resistor 110. A capacitor 112 is placed across the relay coil 102. The values of the elements in circuit 36 are the same as those in circuit 34.

A dotted line 114 is used to indicate that the relay coil 62 operates the relay operable switch contacts 96 and a dotted line 116 illustrates the connection between coil 102 and relay operable relay switch 54.

Operation

In operation, alternating current source 16 is placed across input terminals 12 and 14. Current will flow from, for example, terminal 12 through line 18 to the motor 22, and to the clockwise coil 24 and the counterclockwise coil 26 to the respective load terminals 28 and 30. Current will flow through line 46 and line 90 to the respective relays 62 and 102. Diodes 70 and 108 rectify the current which is also filtered by relay capacitors 64 and 112. Resistors 72 and 110 provide the necessary limiting resistances for the coils 62 and 102.

As current flows through coil 62, relay operable switch 96 is closed by conventional means indicated by the mechanical coupling 114. In the same manner, coil 102 closes switch 54 through the line 116. The relays may be of the reed type.

TRIACS 40 and 80 are placed in shunt across coils 62 and 102 respectively. Since relay operable switches 54 and 96 are both closed, the closing of either manual switch 56 or 98 will provide current through resistors 58 and 100 to the gates 52 and 92 of the TRIACS.

Assuming that switch 56 is closed first, the TRIAC 40 will be energized and current will flow through the electrodes 48 and 50, thus, shunting the relay coil 62. Since current will no longer flow through the relay, it will be de-energized, thus opening switch 96 in the control circuit 36. Therefore, even if the manual switch 98 is subsequently closed, the TRIAC 80 will not become conductive since switch 96 is open. It will be appreciated that in this manner an interlocking arrangement is provided. Therefore, once one of the windings is energized, the opposite winding cannot be energized until the first one has been de-energized. Since the IR drop across the TRIAC is negligible, the substantially full line voltage will be applied to the motor. In the example just given the motor will operate in a clockwise direction.

Obviously, the reverse procedure will energize the motor in the counterclockwise direction.

While the invention has been described, it will be understood that it is capable of further modifications and this application is intended to cover any variations, uses or adaptations of the invention following in general, the principles of the invention and including such departures from the preset disclosure as come within knowledge or customary practice in the art to which the invention pertains, and as may be applied to the essential features hereinbefore set forth and as fall within the scope of the invention or the limits of the appended claims.

Having thus described the invention, what is claimed is:

1. A motor control comprising:
   (a) a reversible motor,
   (b) a first circuit for providing current for clockwise rotation of said motor,
   (c) a second circuit for providing current for counterclockwise rotation of said motor,
   (d) said circuits each including
      (1) a manually operable switch and a relay operable switch in series,
      (2) a gated control means having a pair of electrodes and a control gate, said switches being connected in series with said control gate,
      (3) a relay, said relay in one of said circuits operatively connected to the relay operable switch in the other of said circuits, said relay being in parallel with said gated control means.

2. A motor control as defined in claim 1 including an A.C. source operatively connected to said motor and said control circuits.

3. A motor control as defined in claim 1 wherein said gated control means is a bi-directional semiconductor triode.

4. A motor control as defined in claim 1, including a diode in series and a capacitor in parallel with said relay.

5. A circuit comprising:
   (a) a load,
   (b) a pair of input terminals,
   (c) an A.C. source connected across said terminals,
   (d) one of said terminals connected to one side of the two sides of said load,
   (e) the other side of said load having a pair of load terminals,
   (f) first and second control circuits connected to said pair of load terminals,
   (g) each of said control circuits including means for conducting current from said A.C. source to said load through one of said pair of load terminals,
   (h) each of said control circuits further having means for preventing current from flowing to said load through the other of said pair of load terminals,
   (i) each of said control circuits including a relatively high impedance path and a shunt path, said shunt path including a normally non-conducting element, said control circuits further including means for causing said normally non-conducting means to become conductive, and
   (j) said high impedance path including a relay coil.

6. A circuit as defined in claim 5 wherein said load is a reversible motor.

7. A circuit as defined in claim 5 wherein means for causing said normally non-conducting means to become conductive includes at least one switch.

8. A circuit as defined in claim 5 wherein said normally non-conducting means is a bi-directional triode silicon thyristor.

9. A circuit as defined in claim 5 wherein said preventing means includes means for interlocking said normally non-conducting elements in each of said circuits for inhibiting both of said normally non-conducting elements from conducting simultaneously.

10. A motor control comprising:
    (a) reversible A.C. motor having clockwise and counterclockwise windings,
    (b) an A.C. source,
    (c) means for connecting said A.C. source to said motor for selectively operating said motor in either a clockwise or a counterclockwise direction,
    (d) said selectively operating means including semiconductive interlocking means for controlling the operation of said motor,
    (e) said selectively operating means including a pair of control circuits, each of said control circuits including a pair of semiconductive switch elements, means for selectively operating said semiconductive switch elements, and means for interlocking said semiconductive switch elements thereby permitting only one semiconductive switch element to conduct at a time, and
    (f) said interlocking means including a relay in parallel with each of said semiconductive switch elements, said semiconductive switch elements including a pair of electrodes and a gate control electrode, said gate control electrode having a relay operable switch in series therewith, each of said relays being connected to the relay operable switch associated with the other of said semiconductive switch elements.

11. A motor control circuit as defined in claim 10 wherein said semiconductive switch elements are TRIACS.

References Cited

UNITED STATES PATENTS

| | | | |
|---|---|---|---|
| 1,955,322 | 4/1934 | Brown | 318—207 XR |
| 3,087,102 | 4/1963 | Brown | 318—207 |
| 3,183,425 | 5/1965 | Slawson | 318—227 |
| 3,252,067 | 5/1966 | Derenbecher | 318—207 |
| 3,268,742 | 8/1966 | Pinckaers | 318—227 XR |
| 3,309,593 | 3/1967 | Egglestone et al. | 318—227 XR |

OTHER REFERENCES

General Electric application note, Using the Triac for Control of AC Power, J. H. Galloway, Fig. 29, p. 17, March 1966, copy in Group 210.

ORIS L. RADER, *Primary Examiner.*

G. Z. RUBINSON, *Assistant Examiner.*

U.S. Cl. X.R.

318—227, 289